(12) United States Patent
Sepulveda et al.

(10) Patent No.: US 6,173,240 B1
(45) Date of Patent: Jan. 9, 2001

(54) MULTIDIMENSIONAL UNCERTAINTY ANALYSIS

(75) Inventors: Marcos Sepulveda, Santa Clara; Roland Rühl, Sunnyvale, both of CA (US)

(73) Assignee: ISE Integrated Systems Engineering AG (CH)

( * ) Notice: Under 35 U.S.C. 154(b), the term of this patent shall be extended for 0 days.

(21) Appl. No.: 09/184,611

(22) Filed: Nov. 2, 1998

(51) Int. Cl.[7] .............................. G06N 7/00; G05B 17/00
(52) U.S. Cl. .................. 703/2; 700/121; 700/31; 702/181
(58) Field of Search ................. 703/2; 702/179, 702/181; 700/29, 30, 31, 121

(56) References Cited

U.S. PATENT DOCUMENTS

| | | | |
|---|---|---|---|
| 4,937,742 | 6/1990 | Marshall | 705/14 |
| 5,262,956 | 11/1993 | De Leeuw | 700/171 |
| 5,269,521 | 12/1993 | Rossides | 705/14 |
| 5,301,109 | 4/1994 | Heck et al. | 700/109 |
| 5,495,417 | 2/1996 | Fuduka et al. | 700/121 |
| 5,546,312 | 8/1996 | Mozumder et al. | 700/97 |
| 5,655,110 | 8/1997 | Krivokapic et al. | 703/19 |

OTHER PUBLICATIONS

F.B. Hildebrand, *Introduction to Numerical Analysis*, McGraw Hill, New York, Second Ed., 1974, pp. 378–445.

M. Webster et al, Report #4: "Application of the Probabilistic Collocation Method for an Uncertainty Analysis of a Simple Ocean Model", Mass. Inst. of Tech., Joint Program on the Science and Policy of Global Change, Jan. 1996.

Wenwei Pan et al, "Uncertainty analysis of direct radiative forcing by anhropogenic sulfate aerosols", Jour. of Geophysical Research, vol. 102 (1997), pp. 21,915–921,924.

Wenwei Pan et al, "An efficient method for parametric uncertainty analysis of numerical geophysical models", Jour. of Geophysical Research, vol. 102 (1997), pp. 21,9245–21,932.

*Primary Examiner*—Eric W. Stamber
*Assistant Examiner*—Kyle J. Choi
(74) *Attorney, Agent, or Firm*—John F. Schipper

(57) ABSTRACT

Method and system for determining the effects of variation of N statistically distributed variables ($N \geq 1$) in a fabrication process for semiconductor and other electronic devices by constructing and using an N-variable model function $G(x_1, \ldots, x_N)$ to model the process. A sequence of orthogonal polynomials is associated with each probability density function $P_i(x_i)$ for each variable $x_i$. These orthogonal polynomials, and products of these polynomials, are used to construct the model function $G(x_1, \ldots, x_N)$, having undetermined coefficients. Coefficient values are estimated by results of measurements or simulations with variable input values determined by the zeroes (collocation points) of selected orthogonal polynomials. A Monte Carlo process is applied to estimate a probability density function associated with the process or device. Coefficients whose magnitudes are very small are used to identify regions of $(x_1, \ldots, x_N)$-space where subsequent Monte Carlo sampling may be substantially reduced. Monte Carlo sampling for the process is also made more transparent using the function $G(x_1, \ldots, x_N)$. The function $G(x_1, \ldots, x_N)$ can be used to calculate individual and joint statistical moments for the process.

28 Claims, 3 Drawing Sheets

MULTIDIMENSIONAL UNCERTAINTY ANALYSIS

FIELD OF THE INVENTION

This invention relates to analysis of simultaneous variation of one or more random variables, representing device structure or manufacturing process characteristics parameters), and to applications of the results to statistical analysis of semiconductor device behavior and semiconductor fabrication processes.

BACKGROUND OF THE INVENTION

Since the early 1960s, technology simulation has played a crucial role in the evolution of semiconductor integrated circuit (IC) technology. The initial simulation of fundamental operating principles of key structures, for example, bipolar and MOS transistors, has provided critical insight into the phenomena associate with the scaling of devices and has led to the development of large scale integration (LSI).

At present, technology simulation is best viewed within the framework of an overall IC Electronic Computer-Aided Design (ECAD) system. Starting from the basic fabrication input,—the individual process "recipes" and data to generate lithographic masks and layouts—these systems attempt to model a complete circuit from the physical structure of its components through to the estimation of overall system performance. As part of the overall ECAD framework, a Technology Computer-Aided Design (TCAD) system's main components are typically a process simulator and/or a device simulator, with appropriate interfaces that mimic experimental setups as closely as possible.

The device simulator's task is to analyze the electrical behavior of the most basic of IC building blocks, the individual transistors or even small sub-circuits, at a very fundamental level. As such, the simulator uses as inputs the individual structural definitions (geometry, material definitions, impurity profiles, contact placement) generated by process simulation, together with appropriate operating conditions, such as ambient temperature, terminal currents and voltages, possibly as functions of time or frequency. A TCAD system's principal outputs are terminal currents and voltages, appropriate for generating more compact models to be used in circuit simulations. A circuit simulator typically defines the interface to higher-level, application-specific synthesis tools. In principle, given a recipe and a set of masks, the TCAD tools themselves can build virtual device structures and then predict performance of entire circuits to a very high degree of accuracy. Modern process and device simulators are capable of rapid characterization, on the order of many structures per hour, as compared to experiments where on is sometimes fortunate to obtain a new structure within a period of a couple months.

At present, TCAD is extensively used during all stages of semiconductor devices and systems manufacturing, from the design phase to process control, when the technology has matured into mass production. Examples of this are discussed by R. W. Dutton and M. R. Pinto, "The use of computer aids in IC technology evolution", Proc. I.E.E.E., vol. 74, no. 12 (December 1986) pp. 1730–1740, and by H. Hosack, "Process modeling and process control needs for process synthesis for ULSI devices", (in) ULSI Science and Technology (1995). As a result of its application, TCAD offers enormous acceleration of the prototyping process for devices, integrated circuits and systems, because expensive manufacturing and metrology can be reduced to a minimum, or even become superfluous. Existing technologies, which are accurately represented in a TCAD environment, can be extrapolated into regions of more aggressively scaled down design rules.

In many semiconductor device fabrication processes, interest centers on variation of several variables or parameters that are random, not deterministic. These fabrication processes may include substrate formation, ion implantation, thermal diffusion, etching of a trench or via, surface passivation, packaging and other similar processes. Examples of random variables or parameters associated with these processes include concentration of a semiconductor dopant deposited in a semiconductor substrate, temperature of a substrate, temperature used for a thermal drive process for diffusion of a selected dopant into a substrate, initial impurity concentration of the substrate used for the thermal drive process, thickness of a substrate used for the thermal drive process, concentration of a selected ion used for implantation of the ion into a substrate, average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer.

Two types of uncertainty affect one's confidence in modeling response of an electronic process, or of an electronic device produced by such a process: structural uncertainty, arising from use of inaccurate or incomplete models; and parametric uncertainty, arising from incomplete knowledge of the relevant variables and of the random distributions of these variables. Parametric uncertainty can be reduced by (1) refining measurements of the input variables that significantly affect the outcome of an electronic fabrication process and/or resulting device and (2) refining the knowledge of interactions between variations of two or more of the input variables and the effects of these joint variations on the process and/or resulting device.

Sensitivity of a fabrication process or a resulting device to variation of one or more of these variables may depend strongly upon the particular values of the other variables. One well known method of examining the effects of variation of one or more variables on a particular result is the Monte Carlo method, wherein each of the variables is varied, often independently, and a plurality of calculations is ran, one or more with each different permutation of the set of variable values. If interest centers on variation of N variables (N≧1), numbered n=1, 2, ..., N, and if variable number n is to be examined for, say, $K_n$ discrete values, a conventional Monte Carlo approach will require running and analyzing $K = K_1 \times K_2 \times \ldots \times K_N$ situations in order to fully explore the variable ranges and interactions of values of the variables. Each Monte Carlo sample or run to model one or more steps in a fabrication process may require use of a complex physical model in order to reflect the interactions of the variables, and each run may require many tens of seconds or minutes to complete. Further, the totality of runs may not adequately illuminate the joint effect of simultaneous variation of several variables because of the plethora of data generated.

What is needed is an approach that allows modeling of simultaneous variation of N random variables, where N is at least 1, so that subsequent Monte Carlo sampling can be performed in less time. Preferably, this approach should allow estimation of an N-variable model function and calculation of joint moments, such as means and variances, for any subset of the N variables. Preferably, this approach should allow presentation of at least some of the results in analytic form as well as in numerical form.

SUMMARY OF THE INVENTION

These needs are met by the invention, which provides an approach for determining a model function for an N-variable process (N≧1) related to modeling of output responses for semiconductor fabrication and semiconductor device behavior. An output response for a process or an electronic device is approximated by a model function $G(x_1, \ldots, x_N)$ that is mathematically tractable and that can be used to estimate a probability density function that applies to the N variables jointly. Once obtained, the model function can be used to calculate statistical moments (mean, variance, skew, kurtosis, etc.) for these variables jointly or individually and can be used to identify regions in $(x_1, \ldots, x_N)$-space where subsequent Monte Carlo sampling may be reduced or eliminated.

The approach begins with a probability density function $P_i(x_i)$ for each of N individual variables $x_i$ (i=1, 2, ..., N; N≧1) and determines a associated sequence $\{H_{i,ri}(x_i)\}_{ri}$ of polynomials of degree ri≧0 in $x_i$ that are mutually orthogonal when integrated using the probability density function as an integrand weighting function. A multidimensional model function $G(x_1, \ldots, x_N)$ of degree up to D in the variables is constructed as a selected sum of polynomial products $H_{1,r1}(x_1)H_{2,r2}(x_2) \ldots H_{N,rN}(x_N)$ (0≦r1+r2+ ... +rN≦D), each multiplied by an undetermined coefficient, which is to be determined. Alternatively, each orthogonal polynomial set $\{H_{i,ri}(x_i)\}_{ri}$ may have its own maximum polynomial degree $D_i$ (0≦ri≦$D_i$).

The polynomial coefficients are determined by requiring that values of the model function $G(x_1, \ldots, x_N)$ be close to observed or simulated values of an output response function $F(x_1, \ldots, x_N)$, when the N variables are set equal to any of a set of collocation values. The collocation values are determined from equations $H_{i,1+D}(x_i)=0$, or $H_{i,1+Di}(x_i)=0$, for the orthogonal polynomials.

After the values of the undetermined coefficients in the selected sum are estimated, an estimate $G(x_1, \ldots, x_N)$ for the multidimensional model function is now fully determined, up to terms of total degree D in the variables, or up to terms of degree $D_i$ in the variable $x_i$. The estimate $G(x_1, \ldots, x_N)$ may be used in subsequent Monte Carlo sampling or other statistical sampling to characterize the output response of interest. The estimate $G(x_1, \ldots, x_N)$ may also be used to estimate statistical moments for the different variables, individually or jointly.

DESCRIPTION OF BEST MODES OF THE INVENTION

Figure 1:
FIG. 1 illustrates a suitable use of the invention.

FIG. 1 illustrates an environment in which the invention might be used. A fabrication process for a semiconductor or other electronic device depends in some way on N randomly varying variables $x_1, x_2, \ldots, x_N$ (N≧1), each of which is preferably continuously variable over its own finite or infinite range, $a_i \leq x_i \leq b_i$. Each variable $x_i$ has an associated non-negative probability density function $p_i(x_i)$. In response to use of particular values for the variables, $x_i = X_i$ (i=1, 2, ..., N), the process produces a numerically measurable output response $F=F(X_1, X_2, \ldots, X_N)$. The output response F may be a physical measurement, such as a threshold or breakdown voltage for a particular gate produced by one or more steps in a fabrication process. Alternatively, the output response F may be a predicted value for a variable produced by a measurement or a simulation used to model the process. One object of the invention is to estimate a suitable multi-dimensional model function $G(x_1, x_2, \ldots, x_N)$ that can be used for various numerical calculations in modeling, but is easier to calculate than the output response(s) for the process.

In addition, one wishes to compute a probability density function for an output response that can be estimated or approximated as a polynomial in the model function G:

$$p(G) = \sum_{i=0}^{D} B_i(G)^i, \qquad (1)$$

where D is a chosen maximum degree for the polynomial p(G) and the coefficients $B_i$ are to be determined. The coefficients $B_0$ and $B_1$ are associated with the mean and the variance, respectively, for the output response. A conventional approach for determining the coefficients $B_i$ is to perform conventional Monte Carlo sampling of the variables $(x_1, x_2, \ldots, x_N)$ at the outset and to calculate the coefficients $B_i$ by averaging. This approach will require tens or hundreds of thousands of test runs, and an individual test run may require complex modeling and calculations for a fabrication process.

The invention provides a different approach that substantially reduces the expense of Monte Carlo sampling required for adequate modeling. Each variable $x_i$ has an associated probability density function $p_i(x_i)$ ($a_i \leq x \leq b_i$) that can be used as a weighting function in an integrand to generate an associated sequence of polynomials $\{H_{i,ri}(x)\}_n$ of degree ri≧0 that are orthogonal when integrated over the domain $a_i \leq x \leq b_i$. That is, the Polynomials $H_{i,r1}(x)$ and $H_{i,r2}(x)$ satisfy the orthogonality relations $$\int_{a_i}^{b_i} p_i(x) H_{i,r1}(x) H_{i,r2}(x) dx = C_{i,r1} \delta_{r1,r2}, \qquad (2)$$

where $\delta_{r1,r2}$ is the Kronecker delta (=0 if r1≠r2; =1 if r1=r2) and $C_{i,r1}$ is a positive constant. The sequence of orthogonal polynomials obtained will depend upon the variable range ($a_i \leq x_i \leq b_i$) and upon the nature of the weighting function $p_i(x_i)$.

Use of a Gaussian distribution $p_i(x)=(2\pi)^{-1/2}\exp(-x^2/2)$ and a symmetric infinite interval ($-\infty<x<\infty$) leads to the Hermite polynomials, defined by $$H_n(x)=(-1)^n \exp(x^2/2)(\partial/\partial x)^n \exp(-x^2/2). \qquad (3A)$$

$$H_0(x)=1, \qquad (3B)$$

$$H_1(x)=x, \qquad (3C)$$

$$H_2(x)=x^2-1, \qquad (3D)$$

$$H_3(x)=x^3-3x, \qquad (3E)$$

$$H_4(x)=x^4-6x^2+3. \qquad (3F)$$

A Gaussian distribution is one of the most useful distributions. A random variable is more likely to be distributed according to this distribution than to be distributed according to any other distribution.

Use of a semi-infinite interval ($0 \leq x \leq \infty$) and an exponential weighting function $p_i(x)=\exp(-x)$ (a low order Poisson process), leads to the Laguerre polynomials. This exponential distribution is useful where the variable has a semi-infinite range.

Use of a finite symmetric interval, such as ($-1 \leq x \leq 1$) and a uniform weighting function $p_i(x)=\frac{1}{2}$, leads to the Legendre polynomials, defined by $$Le_n(x)=(2^n n!)^{-1}(\partial/\partial x)^n\{(x^2-1)^n\}. \tag{4A}$$

$$Le_0(x)=1, \tag{4B}$$

$$Le_1(x)=x, \tag{4C}$$

$$Le_2(x)=x^2-\tfrac{1}{3}, \tag{4D}$$

$$Le_3(x)=x^3-(\tfrac{3}{5})x, \tag{4E}$$

$$Le_4(x)=x^4-(\tfrac{6}{7})x^2+\tfrac{3}{35}. \tag{4F}$$

Use of a finite (symmetric) interval ($-1 \leq x \leq 1$), and of a non-uniform weighting function such as $p_i(x)=(1-x^2)^{-\frac{1}{2}}$, leads to the Chebyshev polynomials. This distribution might be used where the variable values are more likely to occur at or near the ends of a finite interval.

In a functional domain, where only deterministic variables $x_i$ are present, the variable G might be represented as a sum of products, such as $$G_d(x_1, \ldots, x_N) = \sum_{(\{ri\},N,D)} c_{r1,\ldots,rN} \prod_{q=1}^{N} (x_q)^{rq}, \tag{5}$$

where the summation symbol $$\sum_{(\{ri\},N,D)}$$

indicates a permutation sum of terms in which each of a set of N numbers $r1, \ldots, rN$ assumes all possible non-negative integer values that collectively satisfy the following constraint:

$$0 \leq r1 + \ldots + rN \leq D. \tag{6}$$

Here, D is a selected positive integer representing the highest degree of approximation desired for the output variable G, and the coefficients $c_{r1,\ldots,rN}$ are characteristic of the deterministic process studied (FIG. 1). The permutation sum operator in Eq. (5) forms a sum of terms, with each term in this sum being a distinct permutation of the indicated indices $r1, \ldots, rN$, subject to the constraint in Eq. (6). For example, if N=2 and D=2, Eq. (5) becomes $$G_d(x_1, x_2) = \sum_{(\{ri\},N=2,D=2)} c_{r1,r2} \prod_{q=1}^{2} (x_q)^{rq}, \tag{7}$$

$$= c_{0,0} + c_{1,0}x_1 + c_{0,1}x_2 + c_{2,0}x_1^2 + c_{1,1}x_1 x_2 + c_{0,2}x_2^2.$$

In another permutation sum, a system of one or more constraints $$0 \leq ri \leq D_i \; (i=1, \ldots, N) \tag{8}$$

replaces the single constraint set forth in Eq. (6), where $D_i$ is a selected non-negative integer. An example of this is $$G_d(x_1, x_2) = \sum_{(\{ri\},N=2,D_1=3,D_2=1)} c_{r1,r2} \prod_{q=1}^{2} (x_q)^{rq}, \tag{9}$$

$$= c_{0,0} + c_{1,0}x_1 + c_{0,1}x_2 + c_{2,0}x_1^2 + c_{1,1}x_1 x_2 +$$

$$c_{2,1}x_1^2 x_2 + c_{3,0}x_1^3 + c_{3,1}x_1^3 x_2.$$

In a statistical domain, the deterministic variables $x_i$ are replaced by randomly distributed variables $x_i$, and the deterministic output variable $G_d$ is replaced by an output variable with an associated random distribution $$G(x_1, \ldots, x_N) = \sum_{(\{ri\},N,D)} A_{r1,\ldots,rN} \prod_{q=1}^{N} (H_{q,rq}(x_q)) \tag{10}$$

where the same permutation sum operator is applied to the same N polynomial indices $r1, \ldots, rN$ as in Eq. (5). For any orthogonal polynomial set, $H_{q,rq=0}(x_q)=1$ (or another non-zero constant). The coefficients $A_{r1,\ldots,rN}$ are determined in the following manner.

For purposes of illustration, an output response function $$F(x_1,x_2)=x_1^2+x_1 x_2. \tag{11}$$

is used for an estimate for a two-variable process shown in FIG. 1. For purposes of this illustration, N=2 variables with a maximum polynomial degree D=2 are used. An estimated multidimensional model function for the random variable G in Eq. (10) is $$G(x_1,x_2)=A_{0,0}+A_{1,0}H_{1,1}(x_1)+A_{0,1}H_{2,1}(x_2)+A_{2,0}H_{1,2}(x_1)+A_{1,1}H_{1,1}(x_1)H_{2,1}(x_2)+A_{0,2}H_{2,2}(x_2), \tag{12}$$

where $A_{0,0}, A_{1,0}, A_{0,1}, A_{2,0}, A_{1,1}$, and $A_{0,2}$ are undetermined coefficients. Assume, for purposes of this illustration, that the first variable $x_1$ is uniformly distributed on the domain (1,10), with associated mean and standard deviation of $\mu_1=5.5$ and $\sigma_1=\sqrt{(6.75)}$, respectively; and that the second variable $x_2$ is normally distributed with mean $\mu_2=2.0$ and standard deviation $\sigma_2=1.0$ on ($-\infty,\infty$). New transformed variables $$z_i=(x_i-\mu_i)\sigma_i \; (i=1, \ldots, N) \tag{13}$$

are introduced for all Gaussian variables (here, only $x_2$) in Eqs. (3A)–(3F), in order to normalize each of the new variables to mean 0 and standard deviation 1.0. Optionally, a random variable $x_i$ that is not Gaussian (e.g., distributed according to an exponential or finite uniform or finite non-uniform distribution) can be transformed similarly, if desired.

The variable $G(x_1, \ldots, x_N)$ is evaluated at collocation points, which are solutions of the orthogonal polynomials of degree D+1, where D is the highest degree for the variables $x_1, \ldots, x_N$ that appear in $G(x_1, \ldots, x_N)$. For this example, N=2 and D=2, and the collocation points $(x_1,x_2)=(x_{1c},x_{2c})$ become the solutions for the equations $$Le_3(x_1)=(x_1-5.5)^3/(4.5)^3-(\tfrac{3}{5})(x_1-5.5)/(4.5)=0, \tag{14}$$

$$H_3(x_2)=(x_2-2)^3-3(x_2-2)=0. \tag{15}$$

The collocation point pairs become $$(x_{1c,1},x_{2c,1})=(2.01431, 0.267949), \tag{16A}$$

$$(x_{1c,2},x_{2c,2})=(2.01431, 2), \tag{16B}$$

$(x_{1c,3}, x_{2c,3}) = (2.01431, 3.73205),$ (16C)

$(x_{1c,4}, x_{2c,4}) = (5.5, 0.267949),$ (16D)

$(x_{1c,5}, x_{2c,5}) = (5.5, 2),$ (16E)

$(x_{1c,6}, x_{2c,6}) = (5.5, 3.73205),$ (16F)

$(x_{1c,7}, x_{2c,7}) = (8.98569, 0.267949),$ (16G)

$(x_{1c,8}, x_{2c,8}) = (8.98569, 2),$ (16H)

$(x_{1c,9}, x_{2c,9}) = (8.98569, 3.73205),$ (16I)

where a single index k is used to distinguish different collocation pairs. More generally, where N variables appear in the output response function F, Eq. (11), the collocation points will appear as N-tuples.

The coefficients $A_{0,0}, A_{1,0}, A_{0,1}, A_{2,0}, A_{1,1}$, and $A_{0,2}$ in Eq. (12) are chosen to minimize the functional $$\varepsilon(A_{0,0}, A_{1,0}, A_{0,1}, A_{2,0}, A_{1,1}, A_{0,2}) = \qquad (17)$$

$$\sum_{k=1}^{9} w_k \{ A_{0,0} + A_{1,0} H_{1,1}(x_{1c,k}) + A_{0,1} H_{2,1}(x_{2c,k}) +$$

$$A_{2,0} H_{1,2}(x_{1c,k}) + A_{1,1} H_{1,1}(x_{2c,k}) H_{2,1}(x_{2c,k}) +$$

$$A_{0,2} H_{2,2}(x_{2c,k}) - F(x_{1c,k}, x_{2c,k}) \}^2,$$

where the quantities $w_k$ are selected non-negative weighting coefficients and the quantities $F(x_{1c,k}, x_{2c,k})$ are numerical values obtained from calculations using the output response equation (11). For purposes of this example, all weighting coefficients $w_k$ are set equal to 1. Minimization of $\varepsilon$ in Eq. (17) results in the choices $A_{0,0} = 51.00,$ (18A)

$A_{1,0} = 11.00,$ (18B)

$A_{0,1} = 15.00,$ (18C)

$A_{2,0} = 1.00,$ (18D)

$A_{1,1} = 10^{-15} (\approx 0),$ (18E)

$A_{0,2} = 6.00$ (18F)

for the undetermined coefficients in Eq. (12).

In many practical instances, the number M1 of undetermined coefficients will be less than the number M2 of collocation value N-tuples $(x_{1c}, \ldots, x_{Nc})$ that are calculated using an output response function, such as that shown in Eq. (11).

Where the maximum polynomial degree of approximation $D_i$ is specified separately for each variable $x_i$, the number of collocation value N-tuples will be $$M2 = \prod_{i=1}^{N} (1 + D_i). \qquad (19A)$$

Where an overall polynomial degree of approximation D is specified, $M2 = (1+D)^N.$ (19B)

Determination of the number M1 of undetermined coefficients is more complex but may be verified to be $$M1 = \prod_{i=1}^{N} (1 + D_i), \text{ (individual degrees } D_i) \qquad (20A)$$

$$M1 = (D+N)!/\{D!N!\} \text{ (overall degree } D) \qquad (20B)$$

When M1=M2, Eqs. (17) is replaced by a set of N linear equations in the N unknown coefficients $A_{r1, \ldots, rN}$, and the unknown coefficient values $A_{r1, \ldots, rN}$ can be found exactly.

After the coefficient values $A_{r1, \ldots, rN}$ are determined, Eq. (12) can serve as an estimate for the actual two-variable output response function $F(x_1, x_2)$ adopted in Eq. (11). Monte Carlo sampling can now be performed, using the two-variable model function $G(x_1, x_2)$ to determine the relative number of sample runs to be made in each region of $(x_1, x_2)$-space. This approach will usually be less expensive, measured in computer time, effort and funds expended, than a conventional approach to Monte Carlo sampling of the process would be. This approach may also identify a region, corresponding to a coefficient $A_{r1, \ldots, rN}$ with very small magnitude, where little or no interaction of the variables is expected so that the number of Monte Carlo samplings in this region may be reduced or eliminated.

Optionally, the system may provide or compute one or more quality of approximation statistics Q(G) that provide a measure of how well the model function $G(x_1, \ldots, x_N)$ fits the available data. One such measure, Q(G), is the mean square error MSS, defined as the average of the residual sum of squares $$MSS = \sum_{k=1}^{M2} w_k \{ G(x_{1c,k}, \ldots, x_{Nc,k}) - \qquad (21)$$

$$F(x_{1c,k}, \ldots, x_{Nc,k}) \}^2 \bigg/ \sum_{k=1}^{M2} w_k,$$

where $\{w_k\}$ is a set of selected non-negative weighting numbers and the sum extends over all combinations of collocation points $x_i = x_{ic}$ in the M2 collocation N-tuples $(x_{1c,k}, \ldots, x_{Nc,k})$ for the variables $x_i$ in the model function G. A low value for MSS is desired, preferably one that increases no faster than a constant multiplied by $\sqrt{(M2)}$.

Another such measure, Q(G), is the coefficient of determination $R^2$, which measures the proportion of the variation in the actual process values $F(x_1, \ldots, x_N)$ that can be predicted by changes in the variables $(x_1, \ldots, x_N)$, using the model function G $R^2 = NUM/DENOM,$ (22)

$$NUM = \sum_{k=1}^{M2} w_k \{ F(x_{1c,k}, \ldots, x_{Nc,k}) - F(\text{mean}) \}^2, \qquad (23)$$

$$DENOM = \sum_{k=1}^{M2} w_k \{ G(x_{1c,k}, \ldots, x_{Nc,k}) - F(\text{mean}) \}^2, \qquad (24)$$

$$F(\text{mean}) = \sum_{k=1}^{M2} w_k F(x_{1c,k}, \ldots, x_{Nc,k}) \bigg/ \left\{ \sum_{k=1}^{M2} w_k \right\}. \qquad (25)$$

In many instances the weights $w_k$ are all set equal to 1. Ideally, the $R^2$ statistic equals 1, or is very close to 1. The statistic $1-R^2$ is preferably less than a threshold value, such as 0.1 or 0.3. As the number M2 of simulations is reduced, the $R^2$ statistic will increase monotonically, but not necessarily strictly monotonically.

Another measure Q(G) is an adjusted coefficient of determination $R^2(adj)$, which partly compensates for the increase of $R^2$ as M2 is reduced and is defined by $$1-R^2(adj)=(1-R^2)(M2-1)/(M2-M1), \qquad (26)$$

A first preferred condition here is that the quantity $1-R^2$ be no greater than a selected threshold value. A second preferred condition is that $R^2(adj)$ and $R^2$ be reasonably close to each other. If $R^2$ and $R^2(adj)$ differ substantially, it is probable that the model is not sufficiently accurate.

Figure 2A:
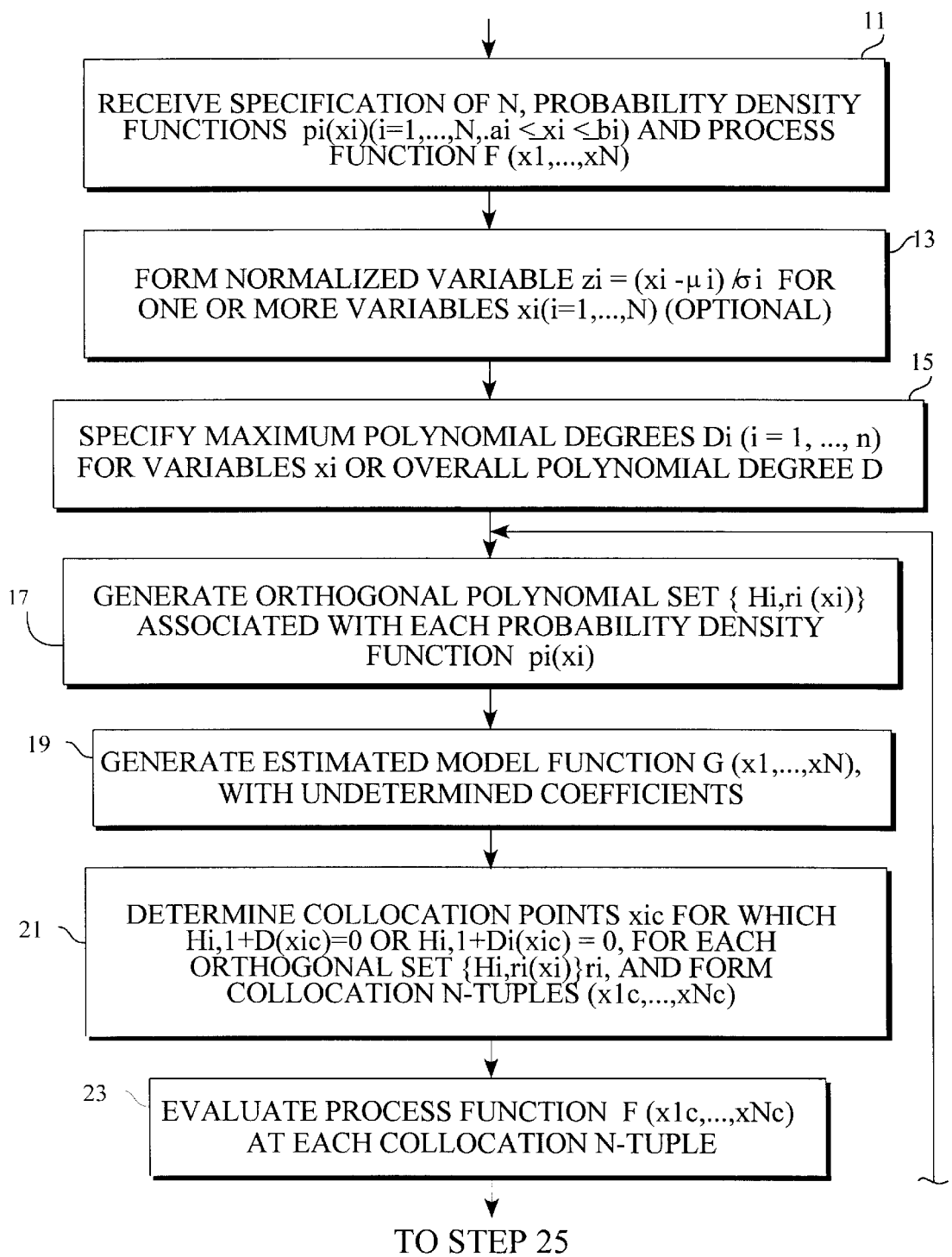
FIG. 2 is a flow chart illustrating a procedure to practicing the invention.
Figure 2B:
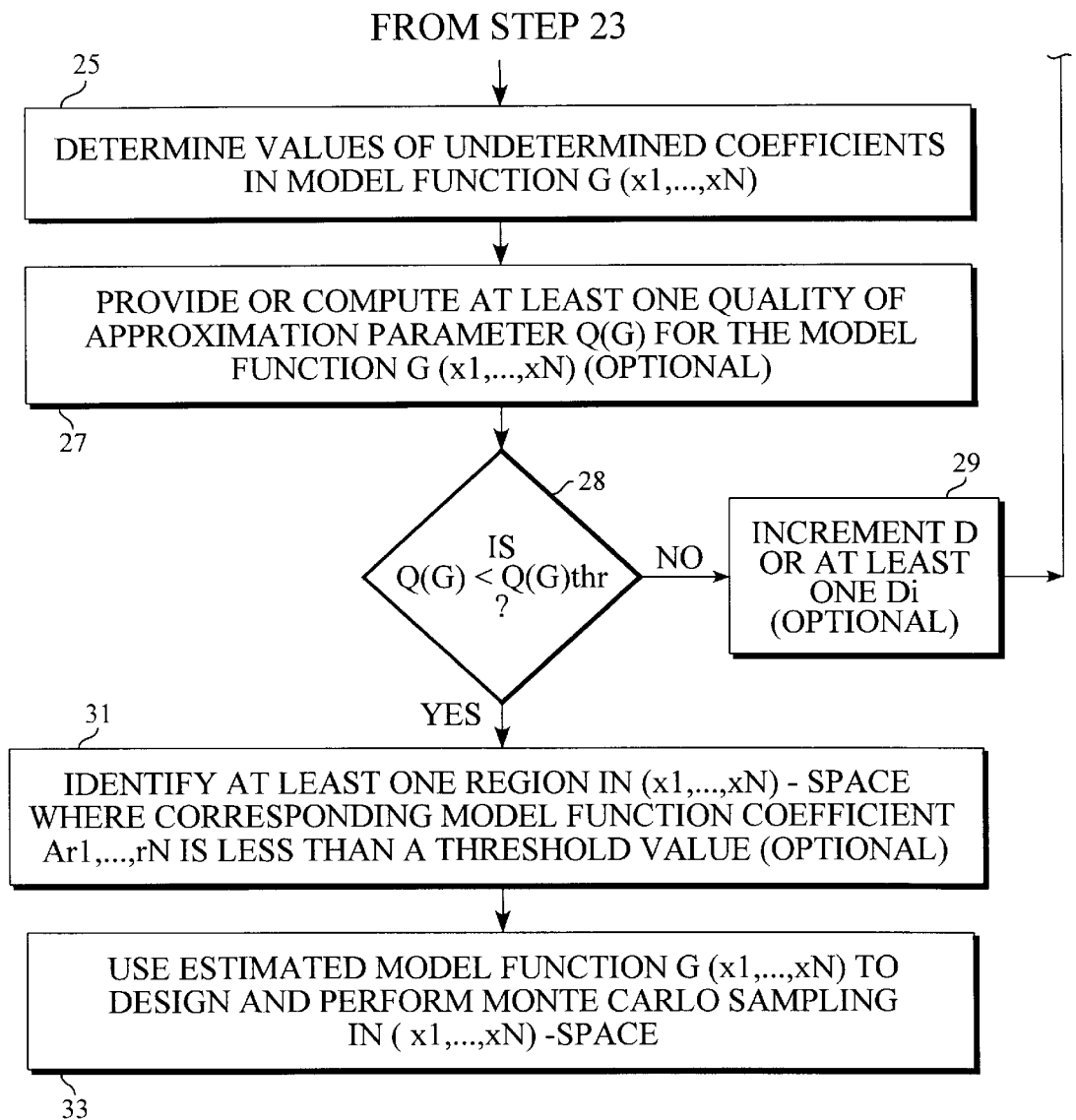

FIG. 2 illustrates a procedure corresponding to one embodiment of the invention. In step 11, the system receives a specification for each of N randomly varying variables $x_i$, a corresponding non-negative probability density function $p_i(x_i)$ (i=1, 2, ..., N; $a_i \leq x_i \leq b_i$) for each variable $x_i$, the integer N and the output response function $F(x_1, \ldots, x_N)$ (analogous to Eq. (11)).

In step 13 (optional), the mean and standard deviation of each variable $x_i$ is specified and Eq. (13) is used to transform each Gaussian variable (and, optionally, one or more non-Gaussian variables) to a mean=0, standard deviation=1 variable.

In step 15, a maximum polynomial degree of approximation $D_i$ for each variable $x_i$, is specified. In place of the N polynomial degrees of approximations $D_i$, a single overall polynomial degree of approximation D can be specified here, as discussed in the preceding development.

In step 17, each probability density function $p_i(x_i)$ is used as a weighting function to generate a sequence of orthogonal polynomials $\{H_{i,ri}(x_i)\}_r$ associated with the weighting function, where the polynomial $H_{i,ri}(x_i)$ is of degree ri in the variable $x_i$, with $0 \leq ri \leq D_i$, and the polynomials satisfy the orthogonality relations set forth in Eq. (2). Alternatively, the polynomial degrees ri associated with the polynomials $H_{i,ri}(x_i)$ collectively satisfy the constraint $0 \leq r1+r2+\ldots+rN \leq D$.

In step 19, an estimate $G(x_1, \ldots, x_N)$ for the N-variable model function $G(x_1, \ldots, x_N)$ is generated, using Eq. (10) or another suitable estimate. This estimate will have several coefficients whose values are to be determined.

In step 21, the collocation points $x_{ic}$ for the corresponding orthogonal polynomial of degree $D_i+1$ are determined, and collocation N-tuples $(x_{1c}, x_{2c}, \ldots, x_{Nc})$ are formed. This will provide a total of M2 collocation N-tuples.

In step 23, the process function $F(x_1, \ldots, x_N)$ is evaluated at each of the collocation N-tuples.

In step 25, the coefficients $A_{r1, \ldots, rN}$ appearing in Eq. (9) are determined. This may be done by least squares minimization, using the analogue of Eq. (17), or by solving a linear set of M2 equations in M2 unknowns, if M1=M2.

In steps 27 and 28 (optional), at least one quality of approximation parameter Q(G) is provided or computed for the model function $G(x_1, \ldots, x_N)$, and the system inquires if Q(G) is no greater than a selected threshold number $Q(G)_{thr}$? If $Q(G) \leq Q(G)_{thr}$, the system proceeds to step 31.

If $Q(G) > Q(G)_{thr}$, the system moves to step 29, where the system increases at least one of the maximum polynomial degrees of approximation $D_i$, or alternatively the overall polynomial degree of approximation D, and recycles to step 17.

In step 31 (optional), one or more regions of $(x_1, \ldots, x_N)$-space is identified where the magnitude of a corresponding coefficient $A_{r1, \ldots, rN}$ is less than a specified coefficient threshold value.

In step 33 (optional), an estimate $G(x_1, \ldots, x_N)$ for the N-variable response output $F(x_1, \ldots, x_N)$ of interest is assembled and used to perform Monte Carlo sampling in the N variables $x_i$. The N-variable function $G(x_1, \ldots, x_N)$ is preferably used to determine the relative number of sample runs to be made in each region of $(x_1, \ldots, x_N)$-space. This sampling can be used to estimate the values of the coefficients $B_i$ in Eq. (1).

The process illustrated in FIG. 1 may be supplanted by K processes ($K \geq 2$) in which (i) each process k (k=1, 2, ..., K) has its own output response function $F_k(x_1, \ldots, x_N)$ (k=1, ... K) or (ii) all K processes participate in a combined process with a single output response $F(x_1, \ldots, x_N)$ or (iii) all K processes participate in a combined process that has K' output responses $F_{k'}(x_1, \ldots, x_N)$ (k'=1, ..., K';$K' \geq 2$).

Preferably, polynomial approximations with low orders, $D_i=1$, 2 or 3 or D=1, 2 or 3, are used here in order to limit the number of coefficients $A_{r1, \ldots, rN}$ to a manageable number. The number N of variables $x_i$ is often limited to a relatively small number in the range $1 \leq N \leq 10$ but may be larger if desired. However, the invention will accommodate any reasonable maximum polynomial degree $D_i$ or D and any reasonable number N of random variables.

Figure 3:
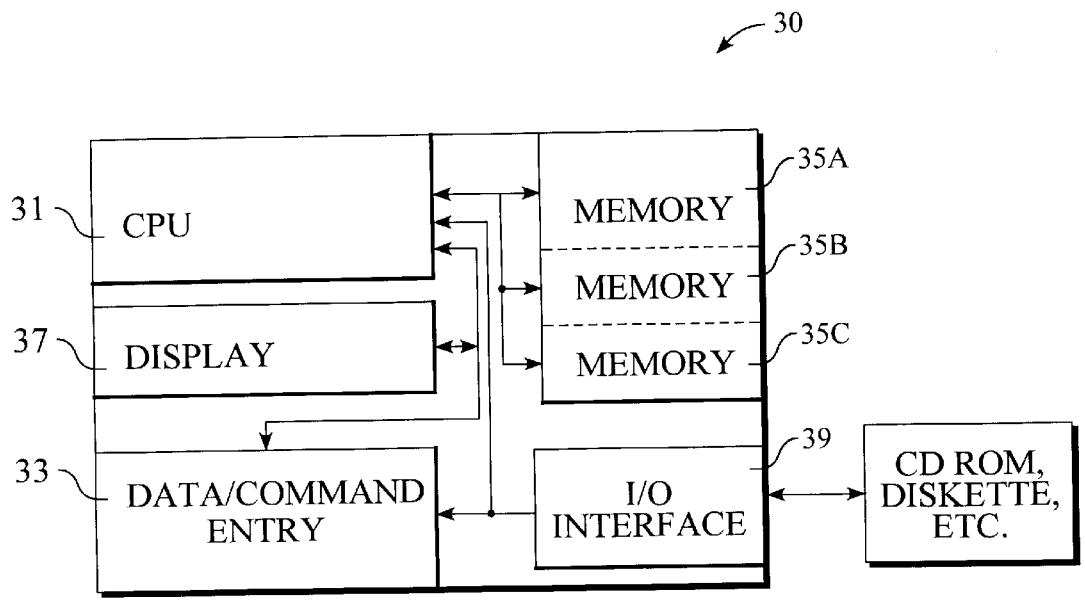
FIG. 3 is a schematic view of computer apparatus arranged to practice the invention.

FIG. 3 schematically illustrates an arrangement of computer apparatus 40 suitable for practicing the invention. The apparatus 40 includes: a CPU 41 and associated registers for numerical and logical processing; a data/command entry mechanism 43 (keyboard or similar device) for entering selected estimation parameters (N, D or $\{D_1, \ldots, D_N\}$, model function, statistical distribution for each variable $x_i$(i=1, ..., N), coefficient magnitude threshold, etc.) to be used to estimate an N-variable model function; a memory component 45A to receive the parameters entered using the data/command entry mechanism 43; a memory component 45B that stores the software commands used to perform the steps set forth in the flow chart in FIG. 2; a visual display 47 (optional) to display the estimated N-variable model function and/or the numerical values of the coefficients $A_{r1, \ldots, rN}$ determined for the model function estimate $G(x_1, \ldots, x_N)$ (Eq. (9)), and an I/O interface 49 (optional) used to import data to, or export data from, the apparatus 40. The apparatus 40 may exchange these data with a CD/ROM, an floppy diskette, a hard disk, an internetwork or any other suitable source of destination for these data. Optionally, the computer apparatus 40 includes a memory component 45C that stores the software commands used (i) to identify one or more regions of $(x_1, \ldots, x_N)$-space where a coefficient $A_{r1, \ldots, rN}$ has a magnitude no larger than a specified coefficient threshold (e.g., $10^{-3}$ or $10^{-7}$), if such region exists, (ii) to perform Monte Carlo sampling of regions in $(x_1, \ldots, x_N)$-space where the coefficients $A_{r1, \ldots, rN}$ have magnitudes larger than the specified coefficient threshold and/or (iii) perform a quality of approximation analysis on the model function estimate $G(x_1, \ldots, x_N)$.

The collocation method developed and applied here is analogous to the method of Gaussian integration that is applied to estimate the value of a definite integral using orthogonal polynomials. Gaussian integration is discussed by F. B. Hildebrand, *Introduction to Numerical Analysis*, McGraw-Hill, Second Edition, 1974, pp. 378–445. Application of a collocation method to geophysical studies is discussed by W. Pan et al in "Uncertainty analysis of direct radiative forcing by anthropogenic sulfate aerosols," Jour. Geophys. Res., vol. 102 (1997) pp. 21915–21924, by M. A. Tatang et al in "An efficient method for parametric uncertainty analysis of numerical geophysical models," Jour. Geophys. Res., vol. 102 (1997) pp. 21925–21932, and by M. Webster et al in "Application of the Probabilistic Collocation Method for an Uncertainty Analysis of a Simple Ocean Model,"M.I.T. Joint Program on the Science and Policy of Global Change, Report No. 4 (January 1996).

Solution of polynomial equations to identify collocation points, solution of least squares problems and solution of systems of linear equations can be performed using routines available in a numerical routine software package such as LAPACK, which is available on the Internet. Currently, Version 2 of LAPACK is available. A printed version of the LAPACK Users' Guide is available for purchase from the Society of Industrial and Applied Mathematics, 3600 University City Science Center, Philadelphia, Pa. 19104-2688.

What is claimed is:

1. A method for determining the effects of variation of one or more random variables in an electronic fabrication process or electronic device response, the method comprising the steps of:

providing an estimated probability density function $p_i(x_i)$ (i=1, ..., N; N≧1) for each of N statistically distributed variables $x_i$, where at least one of the N variables $x_i$ represents a physical variable drawn from the group of semiconductor process variables consisting of: concentration of a semiconductor dopant deposited in a semiconductor substrate, temperature of a substrate, temperature used for a thermal drive process for diffusion of a selected dopant into a substrate, initial impurity concentration of a substrate used for the thermal drive process, thickness of a substrate used for the thermal drive process, concentration of a selected ion used for implantation of the ion into a substrate, average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer applied to at least one surface of a substrate;

for each variable $x_i$, determining a sequence $\{H_{i,ri}(x_i)\}$ (ri≧0) of orthogonal polynomials associated with the probability density function $p_i(x_i)$, where $H_{i,ri}(x_i)$ is a polynomial of degree ri in the variable $x_i$;

providing an output response function $F(x_1, \ldots, x_N)$ for the process and a polynomial degree of approximation D for the variables $x_i$;

using a computer programmed to generate an estimate for an N-variable model function that is defined by $$G(x_1, \ldots, x_N) = \sum_{(\{ri\},N,D)} A_{r1,\ldots,rN} \prod_{q=1}^{N} (H_{q,rq}(x_q)),$$

where $$\sum_{(\{ri\},N,D)}$$

is a permutation sum operator, applied to the N indices r1, ..., rN for the polynomials $H_{q,rq}(x_q)$ and to the indices r1, ..., rN for the coefficients $A_{r1,\ldots,rN}$ that satisfy the constraint 0≦r1+r2+ ... +rN≦D, where $A_{r1,\ldots,rN}$ is a coefficient whose value is not yet determined;

for each variable $x_i$, using the computer to determine collocation points $x_{ic}$, which are solutions of the equation $H_{i,1+D}(x_i)=0$, for i=1, ..., N; and using the output response function and the model function, evaluated at the collocation points $x_i=x_{ic}$ (i=1, ..., N), to estimate values for the coefficients $A_{r1,\ldots,rN}$, and using the estimated values for these coefficients to define the model function.

2. The method of claim 1, further comprising the step of selecting said degree D to be one of the integers 1, 2 and 3.

3. The method of claim 1, further comprising the step of selecting said integer N to lie in the range 1≦N≦10.

4. The method of claim 1, further comprising selecting at least one of said variables $x_i$ to be statistically distributed according to a distribution drawn from the group of distributions consisting, of (1) a Gaussian distribution, (2) an exponential distribution, (3) a uniform distribution over a selected finite interval of variable values, and (4) a non-uniform distribution over a selected finite interval of variable values.

5. The method of claim 1, further comprising the steps of:

providing a quality of approximation statistic Q(G) for said model function $G(x_1, \ldots, x_N)$; and accepting said model function only if the magnitude of the quality of approximation statistic has a value less than a selected threshold value $Q(G)_{thr}$.

6. A system for determining the effects of variation of one or more random variables in an electronic fabrication process or electronic device response, the system comprising a computer programmed:

to receive a specification of an estimated probability density function $p_i(x_i)$ (i=1, ..., N; N≧1) for each of N statistically distributed variables $x_i$, where at least one of the N variables $x_i$ represents a physical variable drawn from the group of semiconductor process variables consisting of: concentration of a semiconductor dopant deposited in a semiconductor substrate, temperature of a substrate, temperature used for a thermal drive process for diffusion of a selected dopant into a substrate, initial impurity concentration of a substrate used for the thermal drive process, thickness of a substrate used for the thermal drive process, concentration of a selected ion used for implantation of the ion into a substrate, average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer applied to at least one surface of a substrate;

for each variable $x_i$, to determine a sequence $\{H_{i,ri}(x_i)\}$ (ri≧0) of orthogonal polynomials associated with the probability density function $p_i(x_i)$, where $H_{i,ri}(x_i)$ is a polynomial of degree ri in the variable $x_i$;

to receive a specification of an output response function $F(x_1, \ldots, x_N)$ for the process and a polynomial degree of approximation D for the variables $x_i$;

to generate an estimate for an N-variable model function that is defined by $$G(x_1, \ldots, x_N) = \sum_{(\{ri\},N,D)} A_{r1,\ldots,rN} \prod_{q=1}^{N} (H_{q,rq}(x_q)),$$

where $$\sum_{(\{ri\},N,D)}$$

is a permutation sum operator, applied to the N indices r1, ... ,rN for the polynomials $H_{q,rq}(x_q)$ and to the indices r1, ... ,rN for the coefficients $A_{r1, \ldots, rN}$ that satisfy the constraint $0 \leq r1+r2+ \ldots +rN \leq D$, where $A_{r1, \ldots, rN}$ is a coefficient whose value is not yet determined;

for each variable $x_i$, to determine collocation points $x_{ic}$, which are solutions of the equation $H_{i,1+D}(x_i)=0$, for i=1, ... , N; and to use the output response function and the model function, evaluated at the collocation points $x_i = x_{ic}$ (i=1, ... , N), to estimate values for the coefficients $A_{r1, \ldots, rN}$, and to use the estimated values for these coefficients to define the model function.

7. The system of claim 6, wherein said degree D is selected to be one of the integers 1, 2 and 3.

8. The system of claim 6, wherein said integer N lies in the range $1 \leq N \leq 10$.

9. The system of claim 6, wherein at least one of said variables $x_i$ is selected to be statistically distributed according to a distribution drawn from the group of distributions consisting of (1) a Gaussian distribution, (2) an exponential distribution, (3) a uniform distribution over a selected finite interval of variable values, and (4) a non-uniform distribution over a selected finite interval of variable values.

10. The system of claim 6, wherein said computer is further programmed:

to provide a quality of approximation statistic Q(G) for said model function $G(x_1, \ldots, x_N)$; and to accept said model function only if the quality of approximation statistic has a value less than a selected threshold value $Q(G)_{thr}$.

11. A method for determining the effects of variation of one or more statistically distributed variables in an electronic fabrication process or electronic device response, the method comprising the steps of:

providing an estimated probability density function $p_i(x_i)$ (i=1, ... , N; $N \geq 1$) for each of N statistically distributed variables $x_i$, where at least one of the N variables $x_i$ represents a physical variable drawn from the group of semiconductor process variables consisting of: concentration of a semiconductor dopant deposited in a semiconductor substrate, temperature of a substrate, temperature used for a thermal drive process for diffusion of a selected dopant into a substrate, initial impurity concentration of a substrate used for the thermal drive process, thickness of a substrate used for the thermal drive process, concentration of a selected ion used for implantation of the ion into a substrates average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer applied to at least one surface of a substrate;

for each variable $x_i$, determining a sequence $\{H_{i,ri}(x_i)\}$ ($ri \geq 0$) of orthogonal polynomials associated with the probability density function $p_i(x_i)$, where $H_{i,ri}(x_i)$ is a polynomial of degree ri in the variable $x_i$;

providing an output response function $F(x_1, \ldots, x_N)$ for the process and a polynomial degree of approximation $D_i$ for each variable $x_i$;

using a computer programmed to generate an estimate for an N-variable model function that is defined by $$G(x_1, \ldots, x_N) = \sum_{(\{ri\},N,D)} A_{r1,\ldots,rN} \prod_{q=1}^{N} (H_{q,rq}(x_q)),$$

where $$\sum_{(\{ri\},N,\{D_i\})}$$

is a permutation sum operator, applied to the N indices r1, ... ,rN for the polynomials $H_{q,rq}(x_q)$ and to the indices r1, ... ,rN for the coefficients $A_{r1, \ldots, rN}$ that satisfy constraints $0 \leq ri \leq D_i$, where $A_{r1, \ldots, rN}$ is a coefficient whose value is not yet determined;

for each variable $x_i$, using the computer to determine collocation points $x_{ic}$, which are solutions of the equation $H_{i,1+D_i}(x_i)=0$, for i=1, ... , N; and using the output response function and the model function, evaluated at the collocation points $x_i = x_{ic}$ (i=1, ... , N), to estimate values for the coefficients $A_{r1, \ldots, rN}$, and using the estimated values for these coefficients to define the model function.

12. The method of claim 11, further comprising the step of selecting said integer N to lie in the range $1 \leq N \leq 10$.

13. The method of claim 11, further comprising the step of selecting at least one of said degrees $D_i$ to be one of the integers 1, 2 and 3.

14. The method of claim 11 further comprising selecting at least one of said variables $x_i$ to be statistically distributed according to a distribution drawn from the group of distributions consisting of (1) a Gaussian distribution, (2) an exponential distribution, (3) a uniform distribution over a selected finite interval of variable values, and (4) a non-uniform distribution over a selected finite interval of variable values.

15. The method of claim 11, further comprising the steps of:

providing a quality of approximation statistic Q(G) for said model function $G(x_1, \ldots, x_N)$; and accepting said model function only if the quality of approximation statistic has a value less than a selected threshold value $Q(G)_{thr}$.

16. A system for determining the effects of variation of one or more statistically distributed variables in an electronic fabrication process, the system comprising a computer programmed:

to receive a specification of an estimated probability density function $p_i(x_i)$ (i=1, ... , N; $N \geq 1$) for each of N statistically distributed variables $x_i$, where at least one of the N variables $x_i$ represents a physical variable drawn from the group of semiconductor process variables consisting of: concentration of a semiconductor dopant deposited in a semiconductor substrate, temperature of a substrate, temperature used for a thermal drive process for diffusion of a selected dopant into a substrate, initial impurity concentration of a substrate used for the thermal drive process thickness of a substrate used for the thermal drive process, concentration of a selected ion used for implantation of the ion into a substrate, average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer applied to at least one surface of a substrate;

for each variable $x_i$, to determine a sequence $\{H_{i,ri}(x_i)\}$ (ri≧0) of orthogonal polynomials associated with the probability density function $p_i(x_i)$, where $H_{i,ri}(x_i)$ a polynomial of degree ri in the variable $x_i$;

to receive a specification of an output response function $F(x_1, \ldots, x_N)$ for the process and a polynomial degree of approximation $D_i$ for each variable $x_i$;

to generate an estimate for an N-variable model function that is defined by $$G(x_1, \ldots, x_N) = \sum_{(\{ri\},N,D)} A_{r1,\ldots,rN} \prod_{q=1}^{N} (H_{q,rq}(x_q)),$$

where $$\sum_{(\{ri\},N,D)}$$

is a permutation sum operator, applied to the N indices r1, . . . ,rN for the polynomials $H_{q,rq}(x_q)$ and to the indices r1, . . . ,rN for the coefficients $A_{r1,\ldots,rN}$ that satisfy constraints $0 \leq ri \leq D_i$, where $A_{r1,\ldots,rN}$ is a coefficient whose value is not yet determined;

for each variable $x_i$, to determine collocation points $x_{ic}$, which are solutions of the equation $H_{i,1+Di}(x_i)=0$, for i=1, . . . , N; and to use the output response function and the model function, evaluated at the collocation points $x_i = x_{ic}$ (i=1, . . . , N), to estimate values for the coefficients $A_{r1,\ldots,rN}$, and to use the estimated values for these coefficients to define the model function.

17. The system of claim 16, wherein said integer N is selected to lie in the range $1 \leq N \leq 10$.

18. The system of claim 16, wherein at least one of said degrees $D_i$ is selected to be one of the integers 1, 2 and 3.

19. The system of claim 16, wherein at least one of said variables $x_i$ is selected to be statistically distributed according to a distribution drawn from the group of distributions consisting of (1) a Gaussian distribution, (2) an exponential distribution, (3) a uniform distribution over a selected finite interval of variable values, and (4) a non-uniform distribution over a selected finite interval of variable values.

20. The system of claim 16, wherein said computer is further programmed:

to provide a quality of approximation statistic Q(G) for said model function $G(x_1, \ldots, x_N)$; and to accept said model function only if the quality of approximation statistic has a value less than a selected threshold value $Q(G)_{thr}$.

21. A method for determining the effects of variation of one or more random variables in an electronic fabrication process or electronic device response, the method comprising the steps of:

providing an estimated probability density function for each of N statistically distributed variables $x_i$(N≧1), where at least one of the N variables $x_i$ represents a physical variable drawn from the group of semiconductor process variables consisting of: concentration of a semiconductor dopant deposited in a semiconductor substrate, temperature of a substrate, temperature used for a thermal drive process for diffusion of a selected dopant into a substrate, initial impurity concentration of a substrate used for the thermal drive process, thickness of a substrate used for the thermal drive process, concentration of a selected ion used for implantation of the ion into a substrate, average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer applied to at least one surface of a substrate;

for each variable $x_i$, determining a sequence $\{H_{i,ri}(x_i)\}$ (ri≧0) of orthogonal polynomials of degree ri associated with the probability density function;

providing an estimated output response function $F(x_1, \ldots, x_N)$ for the process and a polynomial degree of approximation D for the variables $x_i$;

using a computer programmed to generate an estimate for an N-variable model function $G(x_1, \ldots, x_N)$ that is a product of N orthogonal polynomials $H_{i,ri}(x_i)$, one for each variable $x_i$, multiplied by a numerical coefficient and summed over all permutations of the polynomial degrees r1, . . . , rN satisfying a constraint $0 \leq r1 + \ldots + rN \leq D$;

for each variable $x_i$, using the computer to determine collocation points $x_{ic}$, which are solutions of the equation $H_{i,1+D}(x_i)=0$; and using the output response function and the model function, evaluated at the collocation points $x_i = x_{ic}$ (i=1, . . . , N), to estimate values for the numerical coefficients, and using the estimated values for these coefficients to define the model function.

22. A system for determining the effects of variation of one or more random variables in an electronic fabrication process or electronic device response, the system comprising a computer programmed:

to receive a specification of an estimated probability density function for each of N statistically distributed variables $x_i$(N≧1), where at least one of the N variables $x_i$ represents a physical variable drawn from the group of semiconductor process variables consisting of: concentration of a semiconductor dopant deposited in a semiconductor substrate temperature of a substrate, temperature used for a thermal drive process for diffusion of a selected dopant into a substrate, initial impurity concentration of a substrate used for the thermal drive process, thickness of a substrate used for the thermal drive process, concentration of a selected ion used for implantation of the ion into a substrate, average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer applied to at least one surface of a substrate;

for each variable xi, to determine a sequence $\{H_{i,ri}(x_i)\}$ (ri≧0) of orthogonal polynomials of degree ri associated with the probability density function;

to receive a specification of an output response function $F(x_1, \ldots, x_N)$ for the process and a polynomial degree of approximation D for the variables $x_i$;

to generate an estimate for an N-variable model function $G(x_1, \ldots, x_N)$ that is a product of N orthogonal polynomials $H_{i,ri}(x_i)$, one for each variable $x_i$, multiplied by a numerical coefficient and summed over all permutations of the polynomial degrees r1, . . . , rN satisfying a constraint 0≦r1+ . . . +rN≦D;

for each variable $x_i$, to determine collocation points $x_{ic}$, which are solutions of the equation $H_{i,1+D}(x_i)=0$; and to use the output response function and the model function, evaluated at the collocation points $x_i=x_{ic}$ (i=1, . . . , N), to estimate values for the numerical coefficients, and to use the estimated values for these coefficients to define the model function.

23. A method for determining the effects of variation of one or more random variables in an electronic fabrication process or electronic device response, the method comprising the steps of:

providing an estimated probability density function for each of N statistically distributed variables $x_i$(N≧1), where at least one of the N variables $x_i$ represents a physical variable drawn from the group of semiconductor process variables consisting of: concentration of a semiconductor dopant deposited in a semiconductor substrate, temperature of a substrate, temperature used for a thermal drive process for diffusion of a selected dopant into a substrate, initial impurity concentration of a substrate used for the thermal drive process, thickness of a substrate used for the thermal drive process, concentration of a selected ion used for implantation of the ion into a substrate, average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer applied to at least one surface of a substrate;

for each variable $x_i$, determining a sequence $\{H_{i,ri}(x_i)\}$ (ri≧0) of orthogonal polynomials of degree ri associated with the probability density function;

providing an estimated output response function $F(x_1, \ldots, x_N)$ for the process and a polynomial degree of approximation $D_i$ for each of the variables $x_i$;

using a computer programmed to generate an estimate for an N-variable model function $G(x_1, \ldots, x_N)$ that is a product of N orthogonal polynomials $H_{i,ri}(x_i)$, one for each variable $x_i$, multiplied by a numerical coefficient and summed over all permutations of the polynomial degrees r1, . . . , rN satisfying constraints 0≦ri≦$D_i$;

for each variable $x_i$, using the computer to determine collocation points $x_{ic}$, which are solutions of the equation $H_{i,1+Di}(x_i)=0$; and using the output response function and the model function, evaluated at the collocation points $x_i=x_{ic}$ (i=1, . . . , N), to estimate values for the numerical coefficients, and using the estimated values for these coefficients to define the model function.

24. A system for determining the effects of variation of one or more random variables in an electronic fabrication process or electronic device response, the system comprising a computer programmed:

to receive a specification of an estimated probability density function for each of N statistically distributed variables $x_i$(N≧1), where at least one of the N variables $x_i$ represents a physical variable drawn from the group of semiconductor process variables consisting of: concentration of a semiconductor dopant deposited in a semiconductor substrate, temperature of a substrate, temperature used for a thermal drive process for diffusion of a selected dopant into a substrate, initial impurity concentration of a substrate used for the thermal drive process, thickness of a substrate used for the thermal drive process, concentration of a selected ion used for implantation of the ion into a substrate, average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer applied to at least one surface of a substrate;

for each variable $x_i$, to determine a sequence $\{H_{i,ri}(x_i)\}$ (ri≧0) of orthogonal polynomials of degree ri associated with the probability density function;

to receive a specification of an output response function $F(x_1, \ldots, x_N)$ for the process and a polynomial degree of approximation $D_i$ for each variable $x_i$;

to generate an estimate for an N-variable model function $G(x_1, \ldots, x_N)$ that is a product of N orthogonal polynomials $H_{i,ri}(x_i)$, one for each variable $x_i$, multiplied by a numerical coefficient and summed over all permutations of the polynomial degrees r1, . . . , rN satisfying constraints 0≦ri≦$D_i$;

for each variable $x_i$, to determine collocation points $x_{ic}$, which are solutions of the equation $H_{i,1+Di}(x_i)=0$; and to use the output response function and the model function, evaluated at the collocation points $x_i=x_{ic}$ (i=1, . . . , N), to estimate values for the numerical coefficients, and to use the estimated values for these coefficients to define the model function.

25. A computer program product for determining the effects of variation of one or more random variables in an electronic fabrication process or electronic device response, the product comprising a computer usable medium having a computer readable program code mechanism embodied in the medium for determining the effects of variation of one or more statistically distributed variables, the computer readable program code mechanism comprising:

computer readable program code for providing an estimated probability density function $p_i(x_i)$ (i=1, . . . , N; N≧1) for each of N statistically distributed variables $x_i$ for a selected electronic fabrication process or electronic device response;

computer readable program code for determining, for each variable $x_i$, a sequence $\{H_{i,ri}(x_i)\}$ (ri≧0) of orthogonal polynomials associated with the probability density function $p_i(x_i)$, where $H_{i,ri}(x_i)$ is a polynomial of degree ri in the variable $x_i$;

computer readable program code for providing an output response function $F(x_1, \ldots, x_N)$ for the process and a polynomial degree of approximation D for the variables $x_i$;

computer readable program code for generating an estimate for an N-variable model function that is defined by $$G(x_1, \ldots, x_N) = \sum_{(\{ri\},N,D)} A_{r1,\ldots,rN} \prod_{q=1}^{N} (H_{q,rq}(x_q)),$$

where $$\sum_{(\{ri\},N,D)}$$

is a permutation sum operator, applied to the N indices $r1, \ldots, rN$ for the polynomials $H_{q,rq}(x_q)$ and to the indices $r1, \ldots, rN$ for the coefficients $A_{r1, \ldots, rN}$ that satisfy the constraint $0 \leq r1+r2+ \ldots +rN \leq D$, where $A_{r1, \ldots, rN}$ is a coefficient whose value is not yet determined;

computer readable program code for determining, for each variable $x_i$, collocation points $x_{ic}$, which are solutions of the equation $H_{i,1+D}(x_i)=0$, for $i=1, \ldots, N$; and computer readable program code for using the output response function and the model function, evaluated at the collocation points $x_i = x_{ic}$ ($i=1, \ldots, N$), to estimate values for the coefficients $A_{r1, \ldots, rN}$, and using the estimated values for these coefficients to define the model function, where at least one of the N variables $x_i$ represents a physical variable drawn from the group of semiconductor process variables consisting of: concentration of a semiconductor dopant deposited in a semiconductor substrate, temperature of a substrate, temperature used for a thermal drive process for diffusion of a selected dopant into a substrate, initial impurity concentration of a substrate used for the thermal drive process, thickness of a substrate used for the thermal drive process, concentration of a selected ion used for implantation of the ion into a substrate, average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer applied to at least one surface of a substrate.

26. A computer program product for determining the effects of variation of one or more random variables in an electronic fabrication process or electronic device response, the product comprising a computer usable medium having a computer readable program code mechanism embodied in the medium for determining the effects of variation of one or more statistically distributed variables, the computer readable program code mechanism comprising:

computer readable program code for providing an estimated probability density function $p_i(x_i)$ ($i=1, \ldots, N$; $N \geq 1$) for each of N statistically distributed variables $x_i$ for a selected electronic fabrication process or electronic device response;

computer readable program code for determining, for each variable $x_i$, a sequence $\{H_{i,ri}(x_i)\}$ ($ri \geq 0$) of orthogonal polynomials associated with the probability density function $p_i(x_i)$, where $H_{i,ri}(x_i)$ is a polynomial of degree ri in the variable $x_i$;

computer readable program code for providing an output response function $F(x_1, \ldots, x_N)$ for the process and a polynomial degree of approximation $D_i$ for the variable $x_i$;

computer readable program code for generating an estimate for an N-variable model function that is defined by $$G(x_1, \ldots, x_N) = \sum_{(\{ri\},N,D)} A_{r1,\ldots,rN} \prod_{q=1}^{N} (H_{q,rq}(x_q)),$$

where $$\sum_{(\{ri\},N,D)}$$

is a permutation sum operator, applied to the N indices $r1, \ldots, rN$ for the polynomials $H_{q,rq}(x_q)$ and to the indices $r1, \ldots, rN$ for the coefficients $A_{r1, \ldots, rN}$ that satisfy constraints $0 \leq ri \leq D_i$, where $A_{r1, \ldots, rN}$ is a coefficient whose value is not yet determined;

computer readable program code for determining, for each variable $x_i$, collocation points $x_{ic}$, which are solutions of the equation $H_{i,1+D_i}(x_i)=0$, for $i=1, \ldots, N$; and computer readable program code for using the output response function and the model function $G(x_1, \ldots, x_N)$, evaluated at the collocation points $x_i = x_{ic}$ ($i=1, \ldots, N$), to estimate values for the coefficients $A_{r1, \ldots, rN}$, and using the estimated values for these coefficients to define the model function, where at least one of the N variables $x_i$ represents a physical variable drawn from the group of semiconductor process variables consisting of: concentration of a semiconductor dopant deposited in a semiconductor substrate, temperature of a substrate, temperature used for a thermal drive process for diffusion of a selected dopant into a substrate, initial impurity concentration of a substrate used for the thermal drive process, thickness of a substrate used for the thermal drive process, concentration of a selected ion used for implantation of the ion into a substrate, average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer applied to at least one surface of a substrate.

27. A computer program product for determining the effects of variation of one or more random variables in an electronic fabrication process or electronic device response, the product comprising a computer usable medium having a computer readable program code mechanism embodied in the medium for determining the effects of variation of one or more statistically distributed variables, the computer readable program code mechanism comprising:

computer readable program code to receive a specification of an estimated probability density function for each of N statistically distributed variables $x_i (N \geq 1)$ for a selected electronic fabrication process or electronic device response;

computer readable program code to determine, for each variable $x_i$, a sequence $\{H_{i,ri}(x_i)\}$ ($ri \geq 0$) of orthogonal polynomials of degree ri associated with the probability density function;

computer readable program code to receive a specification of an output response function $F(x_1, \ldots, x_N)$ for the process and a polynomial degree of approximation D for the variables $x_i$;

computer readable program code to generate an estimate for an N-variable model function $G(x_1, \ldots, x_N)$ that is a product of N orthogonal polynomials $H_{i,ri}(x_i)$, one for each variable $x_i$, multiplied by a numerical coefficient and summed over all permutations of the polynomial degrees r1, ..., $r_N$ satisfying a constraint $0 \leq r1 + \ldots + rN \leq D$;

computer readable program code to determine, for each variable $x_i$, collocation points $x_{ic}$, which are solutions of the equation $H_{i,1+D}(x_i)=0$; and computer readable program code to use the output response function and the model function, evaluated at the collocation points $x_i=x_{ic}$ (i=1, ..., N), to estimate values for the numerical coefficients, and to use the estimated values for these coefficients to define the model function, where at least one of the N variables $x_i$ represents a physical variable drawn from the group of semiconductor process variables consisting of: concentration of a semiconductor dopant deposited in a semiconductor substrate, temperature of a substrate, temperature used for a thermal drive process for diffusion of a selected dopant into a substrate, initial impurity concentration of a substrate used for the thermal drive process, thickness of a substrate used for the thermal drive process, concentration of a selected ion used for implantation of the ion into a substrate, average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer applied to at least one surface of a substrate.

28. A computer program product for determining the effects of variation of one or more random variables in an electronic fabrication process or electronic device response, the product comprising a computer usable medium having a computer readable program code mechanism embodied in the medium for determining the effects of variation of one or more statistically distributed variables, the computer readable program code mechanism comprising:

computer readable program code to receive a specification of an estimated probability density function for each of N statistically distributed variables $x_i (N \geq 1)$ for a selected electronic fabrication process or electronic device response;

computer readable program code to determine, for each variable $x_i$, a sequence $\{H_{i,ri}(x_i)\}$ ($ri \geq 0$) of orthogonal polynomials of degree ri associated with the probability density function;

computer readable program code to receive a specification of an output response function $F(x_1, \ldots, x_N)$ for the process and a polynomial degree of approximation $D_i$ for each variable $x_i$;

computer readable program code to generate an estimate for an N-variable model function $G(x_1, \ldots, x_N)$ that is a product of N orthogonal polynomials $H_{i,ri}(x_i)$, one for each variable $x_i$, multiplied by a numerical coefficient and summed over all permutations of the polynomial degrees r1, ..., rN satisfying constraints $0 \leq ri \leq D_i$;

computer readable program code to determine, for each variable $x_i$, collocation points $x_{ic}$, which are solutions of the equation $H_{i,1+Di}(x_i)=0$; and computer readable program code to use the output response function and the model function, evaluated at the collocation points $x_i=x_{ic}$ (i=1, ..., N), to estimate values for the numerical coefficients, and to use the estimated values for these coefficients to define the model function, where at least one of the N variables $x_i$ represents a physical variable drawn from the group of semiconductor process variables consisting of: concentration of a semiconductor dopant deposited in a semiconductor substrate, temperature of a substrate, temperature used for a thermal drive process for diffusion of a selected dopant into a substrate, initial impurity concentration of a substrate used for the thermal drive process, thickness of a substrate used for the thermal drive process, concentration of a selected ion used for implantation of the ion into a substrate, average ion energy used for implantation of an ion into a substrate, areal concentration of an ion used for implantation of the ion into a substrate, thickness of a substrate used for an ion implantation process, initial impurity concentration of a substrate used for an ion implantation process, desired incidence angle for etch into a substrate, desired etch distance into a substrate, and thickness of a passivation layer applied to at least one surface of a substrate.

* * * * *